Patented May 24, 1938

2,118,798

UNITED STATES PATENT OFFICE 2,118,798

REFRACTORY

Charles W. Saxe, Worcester, Mass., assignor to Norton Company, Worcester, Mass., a corporation of Massachusetts No Drawing. Application September 27, 1935, Serial No. 42,456

4 Claims. (Cl. 106—9)

The invention relates to refractories, and with regard to its more specific features to refractories particularly for use in wire wound electric furnaces.

One object of the invention is to provide a very high or super refractory mixture and article. Another object of the invention is to provide a composition of matter particularly adaptable for the manufacture of a refractory tube. Another object of the invention is to provide a composition of matter which shall form a homogeneous, porous refractory. Another object of the invention is to provide a homogeneous and porous refractory tube. Another object of the invention is to provide a refractory mixture of excellent workability and dry strength. Another object of the invention is to provide a refractory of low silica content. Another object of the invention is to provide a method of sintering fused alumina. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claims.

I provide fused alumina grain of a high purity, for example around 97% pure crystalline alpha alumina, such as may be made according to the Saunders and White Patent No. 1,263,709. For the best results in the self-bonding of this material I first magnetically separate the iron from all of it, so far as is possible with a magnetic separator, and I kiln roast all the grain. This roasting, for example at a temperature of the order of 1300° C., probably expels most of the soda ($Na_2O$) and also oxidizes any remaining iron present.

I have achieved excellent results by providing a mixture of fused alumina grain of the character above indicated, in the following mesh sizes and proportions and with a special treatment of part thereof indicated in the following table:

| Mesh size | Percent |
| --- | --- |
| 90 | 17.5 |
| 120 | 17.5 |
| 150 | 17.5 |
| 180 | 17.5 |
| 500, washed with HCl or $H_2SO_4$ | 20.0 |

The percentages above are percentages of the total mixture and it will be seen that they add up to 90%. The remaining 10%, according to the preferred form of my invention, comprises 9% (of the total mixture) Bayer process alumina, and 1% (of the total mixture) of bentonite.

Bayer process alumina may be defined as crystalline alumina, extremely pure, probably above 99.5% pure, in a highly divided micro-crystalline form, the crystals being in some cases aggregated. It comprises the product of the Bayer process which is itself well known.

Bentonite is an inorganic substance in the nature of clay, and which occurs naturally, is widely distributed and which is considered to be the result of devitrification and chemical alteration of the glassy particles of volcanic ash or tuff, and which has high adsorptive, distensive and colloidal properties. When water is added to it, it becomes soapy to the touch, and slippery. A typical bentonite may analyze approximately as follows:

| | Percent |
| --- | --- |
| $SiO_2$ | 67 |
| $Al_2O_3$ | 22 |
| $Fe_2O_3$ | 4.1 |
| $MgO$ | 2.51 |
| $CaO$ | 1.25 |
| $Na_2O$ | 2.5 |
| $K_2O$ | .46 |
| $TiO_2$ | .18 |

The foregoing mixture comprises graded sizes of alumina, all in crystalline form, and varying from very minute particles of microcrystals, very minute particles of crystal fragments, to relatively coarse particles of lesser purity. This mixture has the property of sintering together when originally compacted together in any suitable manner, and I believe that the finer particles constitute in effect the bond and sinter with the larger particles. Probably some of the impurities in the larger particles have some effect in bonding the whole structure together.

In so much as, according to the best of my information and belief, pure alumina does not fuse at the temperature which I use in firing the mixture, which temperature is preferably that of cone 16, or around 1350° C., it is probable that the bond holding my fired article together comprises the other substances in the bentonite and any impurities remaining in the alumina. I am enabled to achieve excellent results using such a small amount of bond owing to the fact that the grain size is graded so that the pore space between grain is very low.

Notwithstanding the density and strength of the product, it is permeable to a sufficient extent, and this gives it particular utility in connection with many uses, such as those hereinbefore stated and in particular for tubes which are to be wound with high resistance wire and used for heating in metallurgical operations, as in many such operations an inert or reducing gas is used which, in the constructions available, passes through the refractory tube.

The foregoing description gives the composition of the permanent ingredients. However, to give the product dry green strength I add a suitable organic binder and also water. Any one of the organic binders may be employed, but I have achieved excellent results with a pregelatinized starch having the trade name "Mogul". This I add in the proportion of about .25% of the total permanent ingredients.

How much water is added depends upon the method of forming the green product. I may form a slip and mold a tube in a plaster of Paris mold according to known practice, pouring out the excess slip and removing the tube after water absorption, and firing the tube. Or I may add a small amount of water and form the required shape in a press. Or I may form the required shape in a steel or iron or plaster mold, tamping the mixture to achieve the required density.

As heretofore stated, the green shaped product is fired in a kiln at cone 16 or thereabouts. The result is a refractory, either a tube or otherwise, which is substantially white, which comprises graded grain sizes bonded together with a minimum of pore space between grains, considering the slight amount of bond used, the entire article, however, being slightly porous.

The high purity of the refractory article gives it refractory qualities up to an unusually high temperature and it also has adequate strength. In fact, it is materially stronger at high temperatures than prior refractories and holds its shape much longer. Furthermore, the high purity gives a greater electrical resistance to the product than articles of lesser purity, because alumina is less conductive than certain other substances, such as ceramics, previously used in refractories and for bonds thereof. This is important because leakage between successive turns of wire has been a factor in past wire wound refractory articles.

In platinum wound furnaces, and also furnaces wound with other metals, for example molybdenum and tungsten to some extent, a high content of silica in the refractory has reacted upon the wire to make it brittle and otherwise reduce its effective life. The refractory of the present invention, however, is so low in silica that the effective life of the wire winding is greatly prolonged.

I have mentioned that the refractory is fired at around 1350° C. It should be understood, however, that it may if desired be fired at a higher temperature, but in so much as the working temperature of wire wound furnaces of the type referred to is around 1700° C. or 1800° C., this working temperature can be depended upon to produce a further firing and strengthening of the article. But for other uses a higher temperature than cone 16 may be used in firing if additional strength and durability are wanted.

But in any case, the refractory of the invention stands up at continued use at temperatures around 1700° or 1800° C.

It will thus be seen that there has been provided by this invention a method, composition and article, in which the various objects hereinabove set forth together with many thoroughly practical advantages are successfully achieved. As various possible embodiments might be made of the mechanical features of the above invention, and as the art herein described might be varied in various parts, all without departing from the scope of the invention, it is to be understood that all matter hereinbefore set forth is to be interpreted as illustrative and not in a limiting sense.

In the appended claims, the expression "bentonite" is to include other inorganic substances of similar chemical composition and having adsorptive, distensive and colloidal properties.

I claim:

1. Method of producing a porous refractory of high refractory qualities comprising selecting graded sizes of relatively pure fused alumina, mixing them together and with a small amount of alumina of micro-crystalline structure, adding bentonite of the order of 3% or less, forming and firing.

2. A refractory article comprising 97% alumina of a purity of 97% or better, in graded sizes including a substantial quantity, not less than 5%, of micro-crystalline alumina, and bentonite.

3. A mixture for the production of a refractory of high refractory qualities comprising graded mesh sizes of relatively pure crystalline alumina of relatively coarse crystalline structure, 80% or more, relatively pure alumina of micro-crystalline structure in fine mesh sizes 5% or more, there being a total alumina content of 97% or more, .5% or more of an adsorptive, distensive and colloidal clay, and a temporary binder of pregelatinized starch.

4. A refractory comprising fused alumina in graded sizes bonded together with microcrystalline alumina and bentonite.

CHARLES W. SAXE.